Dec. 11, 1923.
O. A. KNOPP
ELECTRIC REGISTER
Filed March 1, 1920
1,477,367
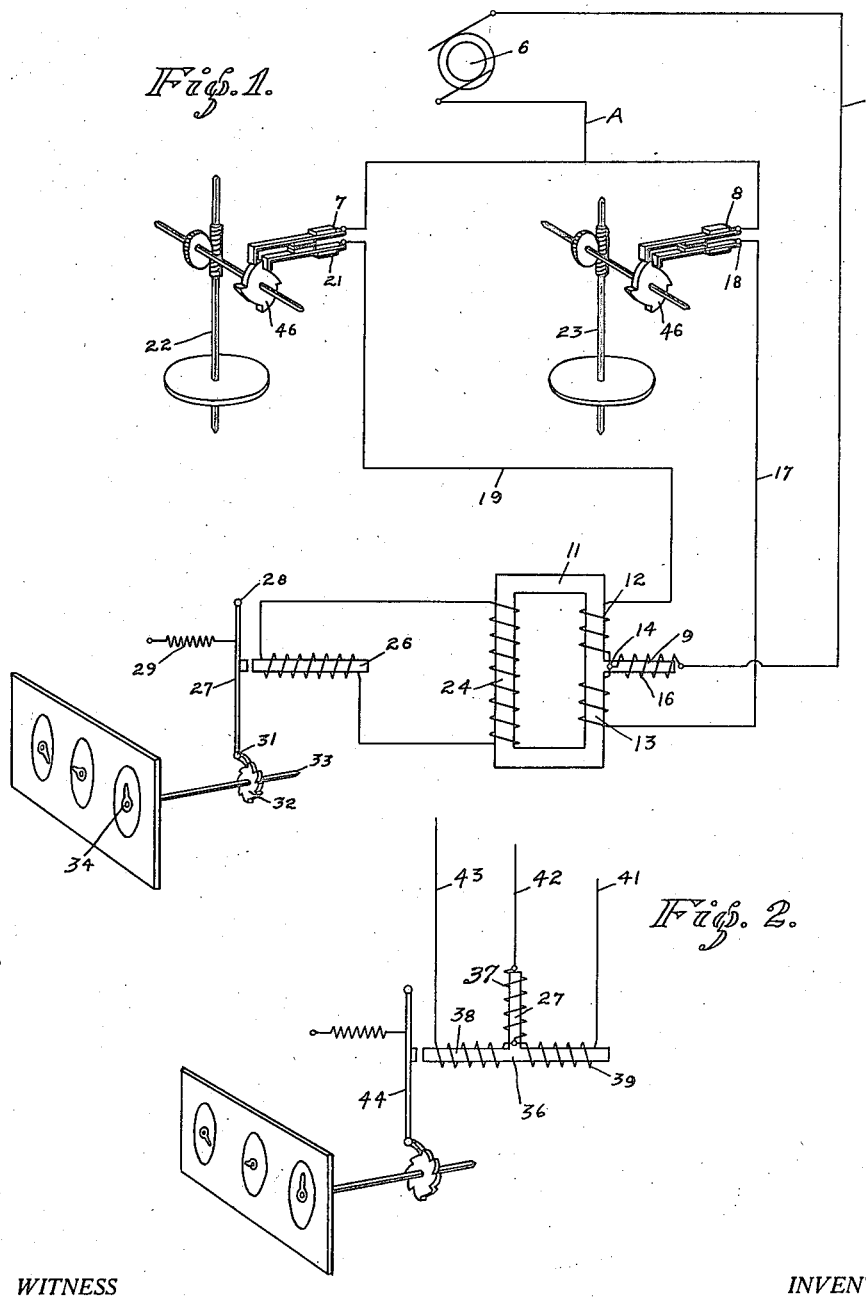
WITNESS
Bradley L. Benson
INVENTOR
OTTO A. KNOPP
BY
Baldwin Vale
ATTORNEYS Patented Dec. 11, 1923.

1,477,367

UNITED STATES PATENT OFFICE.

OTTO A. KNOPP, OF OAKLAND, CALIFORNIA, ASSIGNOR TO GENERAL ELECTRIC COMPANY, A CORPORATION OF NEW YORK.

ELECTRIC REGISTER.

Application filed March 1, 1920. Serial No. 362,454.

*To all whom it may concern:*

Be it known that I, OTTO A. KNOPP, a citizen of the United States, and a resident of the city of Oakland, county of Alameda, State of California, have made a new and useful invention, to wit: Improvements in Electric Registers; and I do hereby declare the following to be a full, clear, concise, and exact description of the same.

The principal object of this invention is to construct an apparatus which will register simultaneously on one dial the record of two meters located at a distant point.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying drawings,

Fig. 1 is a diagrammatic view of the wiring of my improved apparatus.

Fig. 2 is a diagrammatic view of a modified form thereof.

The numeral 6 indicates an alternating current generator furnishing current through the wires A and B. The current from the wire A divides and passes to the contact members 7 and 8, while the wire B delivers current to the impedance coil 9. At 11, I have shown a transformer or magnetic core having primary windings 12 and 13. These windings 12 and 13 are wound in opposition to each other, and have one of their ends connected at 14 to the winding 16 of the impedance coil 9. The free end of the coil 13 is connected by a suitable wire 17 to the contact member 18, which is opposite the contact member 8. The free end of the coil 12 is conected by a suitable wire 19 to the contact member 21 which is opposite the contact member 7. The contacts 7, 21, 8 and 18 are diagrammatically illustrated in Figure 1 of the drawings. The said contacts are preferably constructed of spring metal of any desirable sort and fixed at the ends thereof opposite the cam wheel 46, within a casing or housing of a recording meter such as 22 and 23 of any description. The numerals 22 and 23 refer to recording meters which may be electric, gas, or a meter for measuring any commodity. The secondary side of the transformer 11 is shown at 24. This secondary winding 24 furnishes current to an electromagnet 26 which is opposite the armature 27, pivoted at 28 and held in retracted position by the spring 29.

On the lower end of the armature 28, I have shown a dog 31, suitably pivoted and adapted to engage a ratchet wheel 32 mounted upon a spindle 33. This spindle 33 is connected in any suitable manner to a dial 34. It is understood that this dial 34 is located at a point distant from the meters 22 and 23.

In Fig. 2, I have shown a similar arrangement, except that I do away with the closed magnetic core and use an open magnetic core 36 having an impedance coil 37 connected similarly to the impedance coil 9 of Fig. 1.

The wiring 38 corresponds to the wiring 12 of Fig. 1 and the wiring 39 corresponds to the wiring 13 of Fig. 1, while the wire 41 corresponds to the wire 17 of Fig. 1, the wire 42 to the wire B of Fig. 1 and the wire 43 corresponds to the wire 19 of Fig. 1. The armature 44 and associated parts are similar to that of Fig. 1, and consequently need no explanation.

In the meters 22 and 23, I have shown the usual disk mounted upon a shaft and having a worm adapted to rotate a shaft carrying contact operating members 46.

The operation of my device is as follows: As the disk of the meter 23 revolves, motion is transmitted to the contact making member 46 which brings the contacts carried by the members 8 and 18 together. This sends an impulse through the wire 17, impedance coil 9 and wire B back to the generator 6. This sets up an impulse in the secondary winding which energizes electromagnet 26 and operates the armature 27, dog 31, ratchet 32, shaft 33 and indicates on the dial 34. When the disk of the motor 22 revolves, a similar action takes place, and as the contacts 7 and 21 come together, an impulse is sent through the wire 19, winding 12, impedance coil 9, wire B and back to generator. This impulse creates the current in the secondary winding 24, which in turn energizes electromagnet 26 and causes a further indication on the dial 34.

Frequently it is desirable to register at a distant point the impulses of two meters, but there is a liability of getting an impulse from one meter while the other meter is still under registration on the distant dial.

If this should occur, it would result in under registration. The object of this invention is to prevent such under registration by means of the transforming device 11. If one meter is sending an impulse through the windings of the transformer or magnetic core and the second meter should send an impulse into the transformer while the impulse in the first meter was still energizing the electromagnet 26, this new impulse would cause the demagnetization of the electromagnet through the reverse winding of the transformer. The continuation of the independent impulses from either of the meters would cause the electromagnet to again become energized and to remain energized so long as independent impulses be sent from either meter. If either meter stops, the impulse from the running meter will record as before outlined. The only possibility of under registration on the distant dial is when both impulses from both meters are made in the same instant or broken in the same instant. This is a possibility, however, which is very remote but should it occur that both sets of meter contacts should close simultaneously, each would give its own registration unless by chance the two sets of contacts should open at the same time, in which case, no registration would take place. The impedance coil above referred to prevents any undue rise of current, while both primary windings are under an impulse and opposing each other.

Having thus described my invention, what I claim as new and desire to secure by Letters Patent of the United States is:—

1. In a device of the character described, the combination of a source of current, meters capable of registering a commodity, contacts contacted with said current and operated by said meters, a magnetic core, primary windings on one leg of said magnetic core in opposition to each other, said windings being connected at one end to said source of current and at their opposite ends to said contacts on said meters, and means for registering current impulses passing to said magnetic core.

2. In combination with two electric meters, contact devices operated by said meters, a source of current; an indicating dial; a transformer having primary windings in opposition to each other, one end of said windings being connected to said contacts on said meters and the opposite ends to said source of electric current, an electromagnet adapted to operate said indicating dial, and a secondary winding mounted on said transformer and connected to said electromagnet.

3. In combination two electric meters, contact devices operated by said meters, a source of electric current; a magnetic core, windings thereon in opposition to each other, and one end of said windings connected to said contacts on said meters and the opposite ends to said source of electric current, and means for indicating impulses received by the windings of said magnetic core.

4. In combination with two electric meters; contact members operated mechanically by said meters; a source of current; an indicating dial; a transformer having primary windings in opposition to each other, one end of said windings being connected to said contact members on said meters, and the opposite ends to said source of said current; an electromagnet adapted to operate said indicating dial and a secondary winding mounted on said transformer and connected to said electromagnet.

5. In combination with two electric meters, mechanical contact members operated by said meters; a source of electric current; a magnetic core having separate windings thereon in opposition to each other, one end of each of said windings being connected to said contact members on said meters and the opposite ends to said source of electric current and dial means for indicating impulses received by the windings of said magnetic core.

In testimony whereof, I have hereunto set my hand at San Francisco, California, this 28th day of April, 1919.

OTTO A. KNOPP.

In presence of:—
A. J. HENRY.